(No Model.)
N. CURTIS.
THERMOSTATIC STEAM TRAP.
No. 363,731. Patented May 24, 1887.
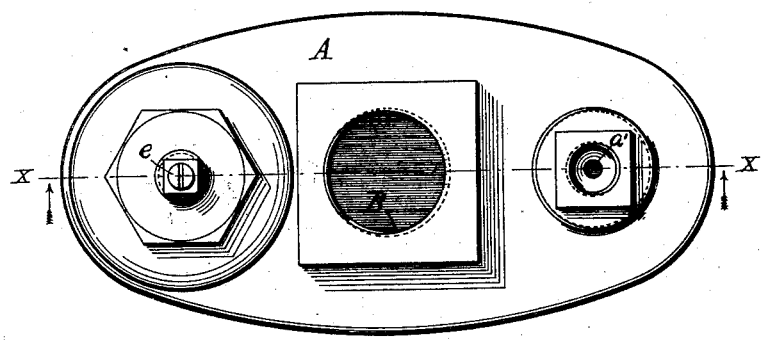
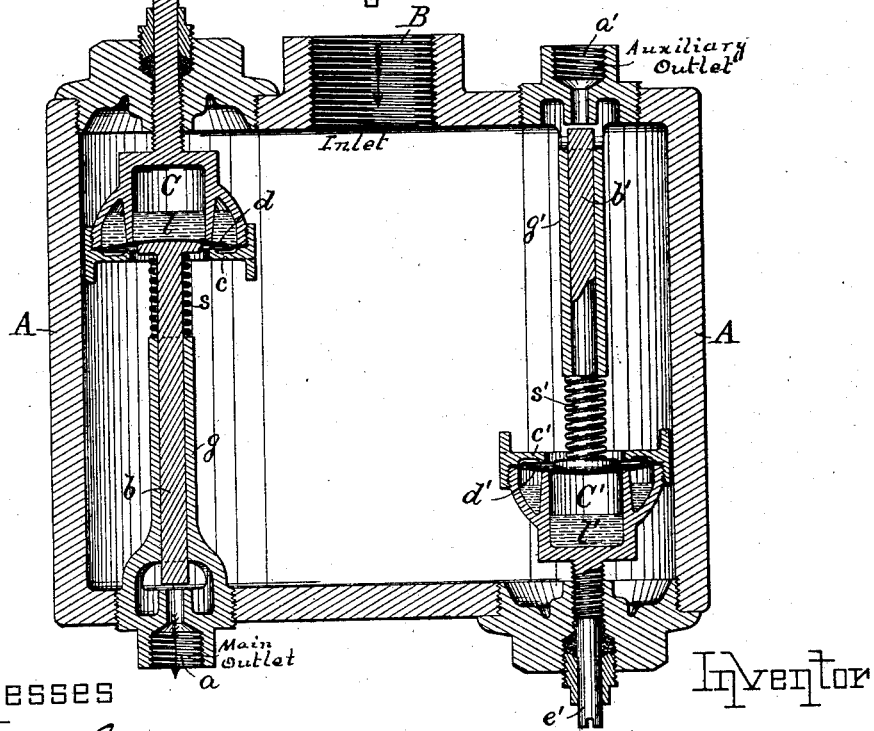

UNITED STATES PATENT OFFICE.

NELSON CURTIS, OF BOSTON, MASSACHUSETTS.

THERMOSTATIC STEAM-TRAP.

SPECIFICATION forming part of Letters Patent No. 363,731, dated May 24, 1887.

Application filed March 11, 1887. Serial No. 230,482. (No model.)

*To all whom it may concern:*

Be it known that I, NELSON CURTIS, of Boston, Massachusetts, have invented a new and useful Improvement in Thermostatic Steam-Traps, of which the following is a specification.

The invention is particularly applicable to thermostatic traps used with steam-heating apparatus, and its object is to restore the trap automatically to its working condition after its outlet for the water of condensation has been frozen up.

When steam is turned off from the steam system with which the trap is connected and the trap is exposed to temperature sufficiently low, before all the water of condensation can flow out a vacuum will be created in the trap sufficient to balance a small head of water in the outlet of the trap, and if this water freezes the outlet will thereby be closed, and not only will the trap be useless to perform its office until it is thawed out by extraneous means, but the entire steam system will be inoperative when steam is turned on again unless some other outlet is provided. By my invention I provide such other outlet automatically; and the invention consists in providing a thermostatic steam-trap with an additional valved outlet controlled by a second thermostat that may be set to close its valve at a lower temperature than that at which the main thermostat closes the main outlet.

In carrying out my invention I have applied it to a well-known kind of steam-trap in which the thermostat consists of an expansion-vessel, and I have used an expansion-vessel as the thermostat for closing the additional outlet; but the invention is applicable to other forms of thermostatic traps, and other forms of thermostats for closing the additional outlet might be used without departing from my invention.

In the drawings, Figure 1 is a plan of the top of a trap embodying my invention. Fig. 2 is a section on line $x\ x$ of Fig. 1.

A is the shell or body of the trap, containing a large steam-tight chamber, as shown. B is the inlet to the trap. $a$ is the main outlet. $b$ is a valve controlling that outlet and working in a guide, $g$. C is an expansion-vessel having a flexible side, $d$, against which the stem of the valve $b$ is pressed by a spring, $s$. The flexible side $d$ is held in place by a cap, $c$, screwed upon the main portion of the expansion-vessel, as shown. A threaded stem, $e$, projecting from the expansion-vessel through suitable packing in the shell A, offers a means for adjusting the valve $b$ to close at a required temperature. The liquid within the expansion-vessel is marked $l$. In like manner $a'$ is the additional outlet in the top of the shell or chamber A; $b'$, the valve of said outlet; $g'$, its guide; C', the second expansion-vessel; $d'$, its flexible side, against which the stem of the valve $b'$ presses by force of spring $s'$. $c'$ is the cap holding the flexible side $d'$ in place, and $e'$ is the threaded adjusting-stem of vessel C', while $l'$ is the liquid in said vessel C'.

In the operation, when steam is first let on, both outlets are open to their full extent, and the pressure of the steam will drive the air and water in the pipes into the trap, whence they will escape through the two outlets. When the temperature of the contents of the traps reaches, say, one hundred and eighty degrees, the upper valve will close, and when a greater temperature—say two hundred and twelve degrees—is reached the lower valve will close. The lower valve alone will open if the temperature lowers a few degrees, and the trap will discharge water of condensation through the lower outlet without blowing steam. This is the normal operation of the trap while steam is on. When steam is turned off, the valve in the upper outlet, although opening later than the lower valve, will generally open soon enough to prevent a vacuum that would tend to retain water in the lower outlet in the manner above set forth; and even if the lower outlet does freeze up the upper outlet will furnish an outlet for air, and, if need be, for water, when steam is again let on to provide a sufficient circulation until the heat in the trap thaws out the lower outlet.

Although I have shown the outlets at $a'$ in the bottom and top of the trap respectively, it is obvious that within reasonable limitations they might be in the sides of the trap at or near the bottom and top, respectively, without departing from my invention.

I claim—

A steam-trap consisting of a shell with two outlets, one in or near the bottom and the other in or near the top, and each provided with a valve and a thermostat for operating said valve, substantially as described.

NELSON CURTIS.

Witnesses:
WM. S. ROGERS,
STEPHEN F. MORONEY.